(12) United States Patent
De Smet et al.

(10) Patent No.: US 10,167,808 B2
(45) Date of Patent: Jan. 1, 2019

(54) CORRECTION OF AN INJECTED QUANTITY OF FUEL

(71) Applicant: Ford Global Technologies, LLC, Dearborn, MI (US)

(72) Inventors: Frederik De Smet, Genk (BE); Christian Winge Vigild, Aldenhoven (DE); Daniel Roettger, Eynatten (BE)

(73) Assignee: Ford Global Technologies, LLC, Dearborn, MI (US)

( * ) Notice: Subject to any disclaimer, the term of this patent is extended or adjusted under 35 U.S.C. 154(b) by 7 days.

(21) Appl. No.: 15/232,172

(22) Filed: Aug. 9, 2016

(65) Prior Publication Data

US 2017/0058821 A1 Mar. 2, 2017

(30) Foreign Application Priority Data

Aug. 26, 2015 (DE) .......................... 10 2015 216 303

(51) Int. Cl.
*F02D 41/40* (2006.01)
*F02D 21/08* (2006.01)
(Continued)

(52) U.S. Cl.
CPC ............ *F02D 41/40* (2013.01); *F02B 37/183* (2013.01); *F02D 21/08* (2013.01);
(Continued)

(58) Field of Classification Search
CPC .. F02D 41/40; F02D 41/0062; F02D 41/1454; F02D 41/0052; F02D 41/1461;
(Continued)

(56) References Cited

U.S. PATENT DOCUMENTS 6,279,537 B1 * 8/2001 Yonekura ............... F01N 3/0842
123/406.48
6,826,471 B2 * 11/2004 Daudel ................. F02D 35/023
123/435
(Continued)

FOREIGN PATENT DOCUMENTS

DE 10316112 A1 10/2004
DE 102009016509 A1 10/2010
(Continued)

OTHER PUBLICATIONS

Vigild, Christian Winge, et al., "Method and Device for Controlling a Motor-Vehicle Internal Combustion Engine Fitted with a Fuel Injection System and an Exhaust Gas Recirculation System," U.S. Appl. No. 15/243,494, filed Aug. 22, 2016, 50 pages.

*Primary Examiner* — Stephen K Cronin
*Assistant Examiner* — Xiao Mo
(74) *Attorney, Agent, or Firm* — Julia Voutyras; McCoy Russell LLP (57) ABSTRACT

A method for adjusting an actual value of a quantity of fuel injected into an internal combustion engine of a motor vehicle to a target value is provided, wherein a deviation of the actual quantity of fuel injected from the target value is determined based on a ratio of the component of the combusted quantity of gas in the induction system to the concentration of oxides of nitrogen in the exhaust system and the injected quantity of fuel is readjusted according to the deviation. Furthermore, an arrangement for carrying out the method is provided.

18 Claims, 6 Drawing Sheets

(51) Int. Cl.
*F02M 26/05* (2016.01)
*F02M 26/06* (2016.01)
*F02M 26/15* (2016.01)
*F02D 41/00* (2006.01)
*F02B 37/18* (2006.01)
*F02D 41/14* (2006.01)
*F02D 41/26* (2006.01)
*F02M 35/10* (2006.01)
*F02M 35/104* (2006.01)

(52) U.S. Cl.
CPC ..... *F02D 41/0052* (2013.01); *F02D 41/0062* (2013.01); *F02D 41/0077* (2013.01); *F02D 41/1454* (2013.01); *F02D 41/1461* (2013.01); *F02D 41/26* (2013.01); *F02M 26/05* (2016.02); *F02M 26/06* (2016.02); *F02M 26/15* (2016.02); *F02M 35/104* (2013.01); *F02M 35/10373* (2013.01); *Y02T 10/144* (2013.01); *Y02T 10/44* (2013.01); *Y02T 10/47* (2013.01)

(58) Field of Classification Search
CPC ....... F02D 41/26; F02D 21/08; F02M 35/104; F02M 35/10373; F02M 26/05; F02M 26/15; F02M 26/06; F02B 37/183; Y02T 10/47; Y02T 10/44; Y02T 10/144
See application file for complete search history.

(56) References Cited

U.S. PATENT DOCUMENTS

| | | | | |
|---|---|---|---|---|
| 7,281,368 | B2* | 10/2007 | Miyake | F02D 41/0052 123/403 |
| 8,036,812 | B2 | 10/2011 | Vigild et al. | |
| 8,700,291 | B2* | 4/2014 | Herrmann | F02M 26/47 123/568.11 |
| 9,051,892 | B2* | 6/2015 | Vigild | F02D 41/1448 |
| 9,115,623 | B2* | 8/2015 | Prothmann | F02D 41/0007 |
| 9,371,781 | B2* | 6/2016 | Schnorbus | F02M 26/47 |
| 2004/0154590 | A1* | 8/2004 | Yasui | F02D 11/105 123/399 |
| 2005/0274369 | A1 | 12/2005 | Tonetti et al. | |
| 2006/0069494 | A1* | 3/2006 | Yamada | F02D 41/0072 701/108 |
| 2012/0253644 | A1* | 10/2012 | Port | F02D 41/0052 701/109 |
| 2013/0103285 | A1* | 4/2013 | Zimmerschied | F02D 41/1402 701/102 |
| 2013/0199177 | A1 | 8/2013 | Holberg et al. | |
| 2013/0340423 | A1* | 12/2013 | Tsunooka | F02D 41/2454 60/600 |
| 2014/0083083 | A1* | 3/2014 | Prothmann | F02D 41/0007 60/274 |
| 2014/0109868 | A1* | 4/2014 | Zhu | F02D 41/0072 123/349 |
| 2015/0047415 | A1* | 2/2015 | Michalske | F02D 41/1454 73/23.31 |
| 2015/0240750 | A1* | 8/2015 | Tsuda | F02C 6/12 60/605.2 |
| 2016/0222850 | A1* | 8/2016 | Ota | F01N 3/106 |
| 2016/0327534 | A1* | 11/2016 | Sun | G01N 33/0037 |
| 2017/0051654 | A1* | 2/2017 | Gupta | F01N 3/035 |

FOREIGN PATENT DOCUMENTS

| | | |
|---|---|---|
| DE | 102010035364 A1 | 3/2012 |
| DE | 102011002553 A1 | 7/2012 |

* cited by examiner

CORRECTION OF AN INJECTED QUANTITY OF FUEL

CROSS-REFERENCE TO RELATED APPLICATION

This application claims priority to German Patent Application No. 102015216303.2, filed Aug. 26, 2015, the entire contents of which are hereby incorporated by reference for all purposes.

FIELD

The present invention concerns a method for correcting a quantity of fuel injected into an internal combustion engine of a motor vehicle.

BACKGROUND AND SUMMARY

The quantity of fuel injected into the cylinders of internal combustion engines is often used as an input value in connection with a series of emission control strategies. Therefore, it is important to know the exact injected quantity of fuel. If this is known, robust emission control is possible, for example by application of exhaust gas recirculation.

A control device of a management system of the internal combustion engine (engine management system, EMS) usually defines target values for the start and duration of an injection of fuel. The injected quantity is calculated in the EMS for this based on the target values.

The quantity of fuel actually injected can deviate from the target values. A deviation can for example be caused by deposits of combustion residues on the nozzles of the injection devices. Methods for detecting the amount of fuel actually injected are conventionally based on measurement values that are detected by lambda (e.g., oxygen) sensors in the exhaust system and by sensors for air mass flow.

However, the inventors herein have recognized issues with the above approach. As one example, deviations from expected exhaust oxygen concentration may occur due to issues other than fueling errors, such as boost pressure errors. Thus, relying only on the exhaust oxygen sensor output to detect fueling errors may result in unnecessary fueling adjustments when the deviation in exhaust oxygen is due to boost or other issues, reducing engine power or increasing fuel consumption.

Accordingly, embodiments are provided herein to at least partly address the above issues. In one example, a method for controlling an internal combustion engine of a motor vehicle having an induction system, an exhaust system, and an exhaust gas recirculation system, wherein via the exhaust gas recirculation system, a part of an exhaust gas mass flow produced by the internal combustion engine is branched out of the exhaust system, recirculated into an induction plenum chamber of the induction system and passed from there into the internal combustion engine, is provided. The method includes providing an ideal ratio between a component of combusted mass of gas in the induction system ($f_{man}$) and a concentration of oxides of nitrogen molecules in the exhaust system ($CNO_x$) under a condition that said $f_{man}$-$CNO_x$ ratio correlates with a predetermined known quantity of fuel injected into the internal combustion engine; calculating a target value of a CNOx working point using an $f_{man}$ actual value; providing an actual value of $CNO_x$; comparing the provided actual value and the target value of $CNO_x$; and correcting a present deviation of the actual value of CNOx by adjusting to the corresponding target value by increasing or reducing the quantity of fuel injected.

The method according to the disclosure is thus based on an observation of the concentration of oxides of nitrogen in the exhaust system and of the component of the combusted mass of gas in the induction system, e.g., in the inducted charging air, and, if there is a turbocharger present, in the inducted and compressed charging air. A change in the values indicates a change of the quantity of fuel injected from the predetermined known quantity. A deviation from the corresponding target value may already be detected at a measurement point and the injected amount of fuel may be corrected. With different measurement points, a curve may be determined from the ratio for each measurement point, wherein a deviation of a second curve based on the determined actual values from an ideal curve (the first curve) corresponding to the predetermined quantity of fuel injected corresponds to a deviation of the quantity of fuel injected from the predetermined value. In doing so, a deviation from predetermined values of injected fuel can be detected and corrected during the operation of an internal combustion engine.

In another example, a method includes adjusting an exhaust gas recirculation (EGR) valve position to reach a commanded intake oxygen fraction. Responsive to a measured exhaust NOx concentration differing from an expected exhaust NOx concentration, the method includes adjusting one or more fuel injection parameters. The method further includes, responsive to a measured intake oxygen fraction differing from the commanded intake oxygen fraction, adjusting one or more boost control parameters.

In this way, by comparing expected fractions in the intake and the exhaust at a given EGR rate, fueling errors may be differentiated from boost errors based on whether a deviation in the intake fraction or the exhaust fraction is observed. By doing so, various engine operating parameters, such as fuel injection duration and turbocharger conditions, may be adapted to account for drift in component performance, thus maintaining expected/commanded conditions and efficient engine operation.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

The component of the combusted mass of gas in the induction system ($f_{man}$, stated in %) depends on the quantity of recirculated exhaust gas. In the induction manifold or in the induction plenum chamber, there may be at least one sensor that is configured to detect the component of the combusted mass of gas in the induction system. In the exhaust system there may be at least one sensor that is configured to detect the concentration of oxides of nitrogen ($CNO_x$, stated in ppm). The sensor values are each transferred to an engine control device, such as the EMS described above. Oxides of nitrogen arise during the combustion of the fuel in the internal combustion engine.

The profile of a determined curve is preferably given by the equation $CNO_x = \exp(-a*f_{man} - b)$, wherein $CNO_x$ is the value of the concentration of oxides of nitrogen, $f_{man}$ is the component of the combusted mass of gas in the induction system and a and b are mathematical coefficients for the function description. When no fueling errors are present, the profile of CNOx and $f_{man}$ corresponds to the target curve (the middle curve in FIG. 5). If there is an increase in the quantity of the injected fuel, more nitrogen oxide is produced because the combustion temperature is also increased by the greater quantity of fuel. In this case, the second curve is higher than the first, and the deviation is referred to as positive. If there is a reduction in the quantity of the injected fuel, less nitrogen oxide is produced, the second curve is lower than the first, and the deviation is referred to as negative.

In the method according to the disclosure, the injected quantity of fuel is preferably increased if the deviation of the actual value of $CNO_x$ from the corresponding target value is negative, and is reduced if the deviation of the actual value of $CNO_x$ from the corresponding target value is positive.

The changed quantity of the injected fuel acts on the recirculated quantity of exhaust gas. In other words, a deviation is corrected by altering the injected quantity of fuel, and hence the quantity of the recirculated exhaust gas, in order to achieve a defined point on the first curve. This corresponds to a defined ratio between an actual value of $f_{man}$ and a corresponding target value of $CNO_x$, e.g., of an "anticipated" CNOx operating point that is calculated from the actual value, and hence a target value of the injected quantity of fuel.

In a further embodiment of the method, the deviation of the quantity of fuel injected is corrected until an arbitrary point on the first curve is reached. In doing so, a value of $f_{man}$ or $CNO_x$ on the first curve can be selected that should be reached owing to the correction.

In a further embodiment, the recirculated quantity of exhaust gas is additionally controlled depending on the ratio of the $f_{man}$ value to the oxygen content in the exhaust system. In doing so, the exhaust gas recirculation can be advantageously observed. The exhaust gas recirculation rate is calculated with the equation:

$$r_{EGR} = f_{man}/f_{exh}, \text{ wherein } f_{exh} = 1 - O2_{exh}/O2_{fresh}.$$

$r_{EGR}$ is the exhaust gas recirculation rate, $f_{man}$ is the component of the combusted mass of gas in the induction system, $f_{exh}$ is the component of the combusted mass of gas in the exhaust system, $O2_{exh}$ is the residual oxygen content in the exhaust system determined by at least one lambda probe, and $O2_{fresh}$ is the oxygen content in the charging air. The target values of the exhaust gas recirculation are thus adjusted based on the measurement values of the $f_{man}$ sensor in the induction system and of a lambda sensor in the exhaust system. If the measured values of $f_{man}$ do not correspond to values in the region of the target curve (first curve), said values can be controlled in the correct range by changing the charging pressure. If the measured CNOx values do not correspond to the values of the target curve (first curve), i.e. if they are too high or too low, the quantity of the injected fuel is reduced or increased.

The method according to the invention may be performed if the exhaust gas recirculation system is a low-pressure system. It is also possible that the exhaust gas recirculation system be a high-pressure system.

A second aspect of the invention concerns an arrangement for controlling an internal combustion engine with an induction system, an exhaust system and an exhaust gas recirculation system, wherein by the exhaust gas recirculation system, a part of an exhaust gas mass flow produced by the internal combustion engine is branched from the exhaust system, recirculated into an induction plenum chamber of the induction system and is introduced from there into the internal combustion engine, including a sensor for measuring the component of the combusted gas is disposed in the plenum chamber, and a sensor for measuring the concentration of the nitrogen oxide molecules is disposed in the exhaust system.

In the arrangement according to the disclosure, the exhaust gas recirculation system may be a low-pressure system. It is also possible for the exhaust gas recirculation system to be a high-pressure system.

A third aspect of the disclosure concerns a motor vehicle with an arrangement according to the disclosure.

Figure 1:
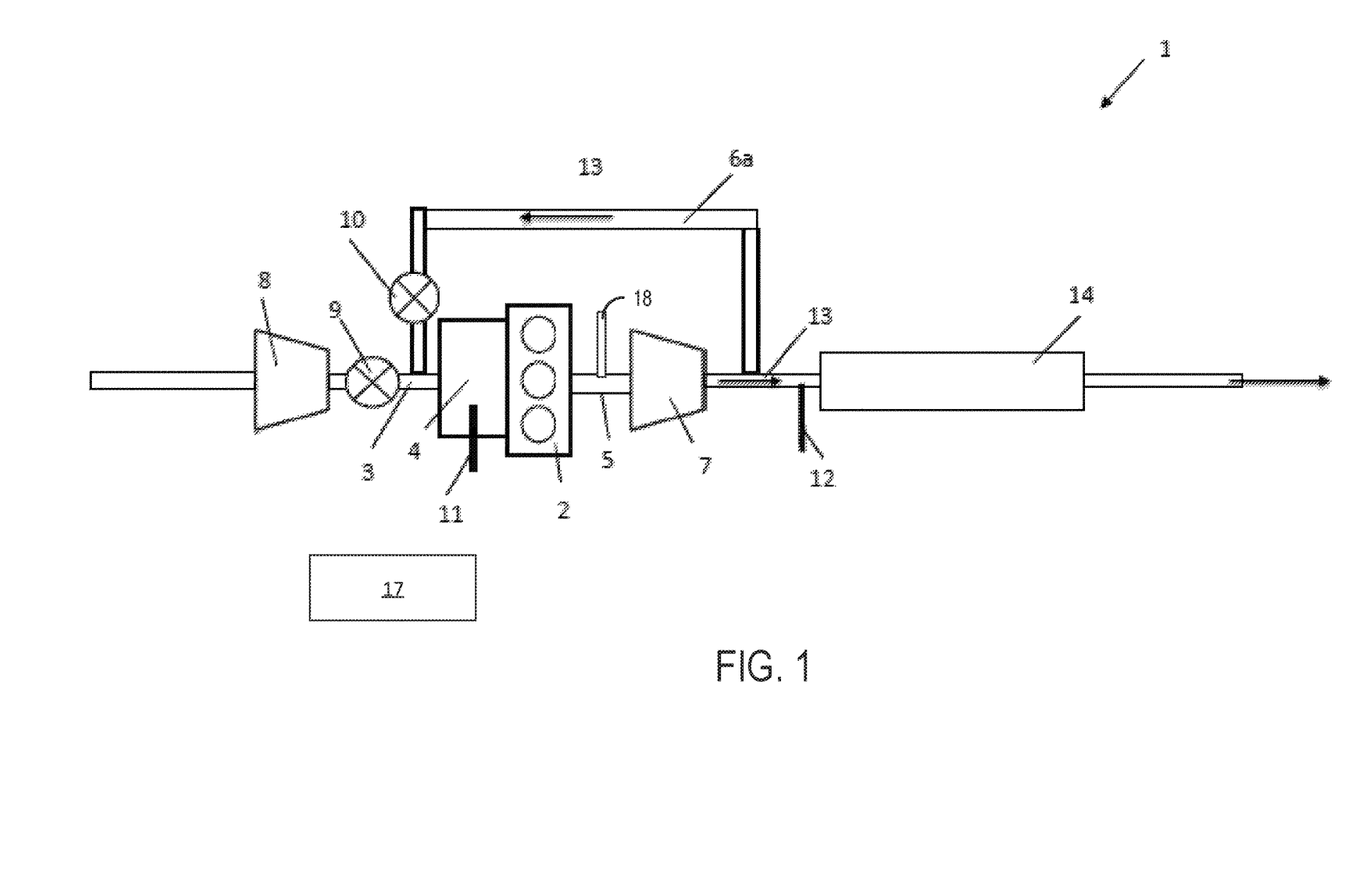
FIG. 1 shows an embodiment of an arrangement according to the disclosure with a high-pressure gas recirculation system.

An arrangement 1 according to the representation of FIG. 1 comprises an internal combustion engine 2. An induction system 3 for delivering charging air leads to the internal combustion engine 2, said air being expanded before the internal combustion engine to form a plenum 4. An exhaust system 5 is used to discharge exhaust gas from the internal combustion engine 2. A line branches from the exhaust system 5 to an exhaust gas recirculation system 6a that is formed as a high pressure exhaust gas recirculation system 6a by a branching upstream before a turbine 7 and an opening into the induction system 3 downstream after a compressor 8 and an induction throttle valve 9. An exhaust gas recirculation valve 10 for controlling the quantity of the recirculated exhaust gas is disposed in the exhaust gas recirculation system 6a. For measuring the component of the combusted mass of gas in the induction system ($f_{man}$), a corresponding sensor 11 is disposed in the plenum 4, referred to in brief as an $f_{man}$ sensor 11. In one example, the $f_{man}$ sensor 11 may be an oxygen sensor positioned to measure the oxygen fraction of gas (e.g., fresh air, EGR) in the plenum (e.g., intake manifold), and the component of the combusted mass of gas in the induction system (e.g., the exhaust fraction) may be inferred from the signal output by the $f_{man}$ sensor.

For measuring the concentration of the oxides of nitrogen ($CNO_x$), a nitrogen oxide sensor 12 is disposed in the exhaust system, being referred to in brief as a $CNO_x$ sensor. The $CNO_x$ sensor 12 is disposed upstream of an exhaust gas aftertreatment system 14 in the direction of flow of the exhaust gas 13. The exhaust gas aftertreatment system 14 comprises the catalytic converters, for example a three-way catalytic converter, an oxidation catalytic converter, a nitrogen oxide storage catalytic converter, a particle filter, and/or a catalytic converter for selective catalytic reduction.

Furthermore, the arrangement comprises a management system with a control device 17 including instructions stored in memory of the control device that are executable by the control device for controlling the injection parameters (for example the volume of the injected fuel, the duration of the injection), for obtaining sensor values from the $f_{man}$ sensor 11 and the $CNO_x$ sensor 12, storing the sensor values, creating a coordinate system, detecting deviations from target values of the quantity of fuel injected, and transmitting changes of the injected quantity of fuel. There can also be lambda sensors in the arrangement in order to detect the oxygen content in the exhaust system, such as sensor 18.

Figure 2:
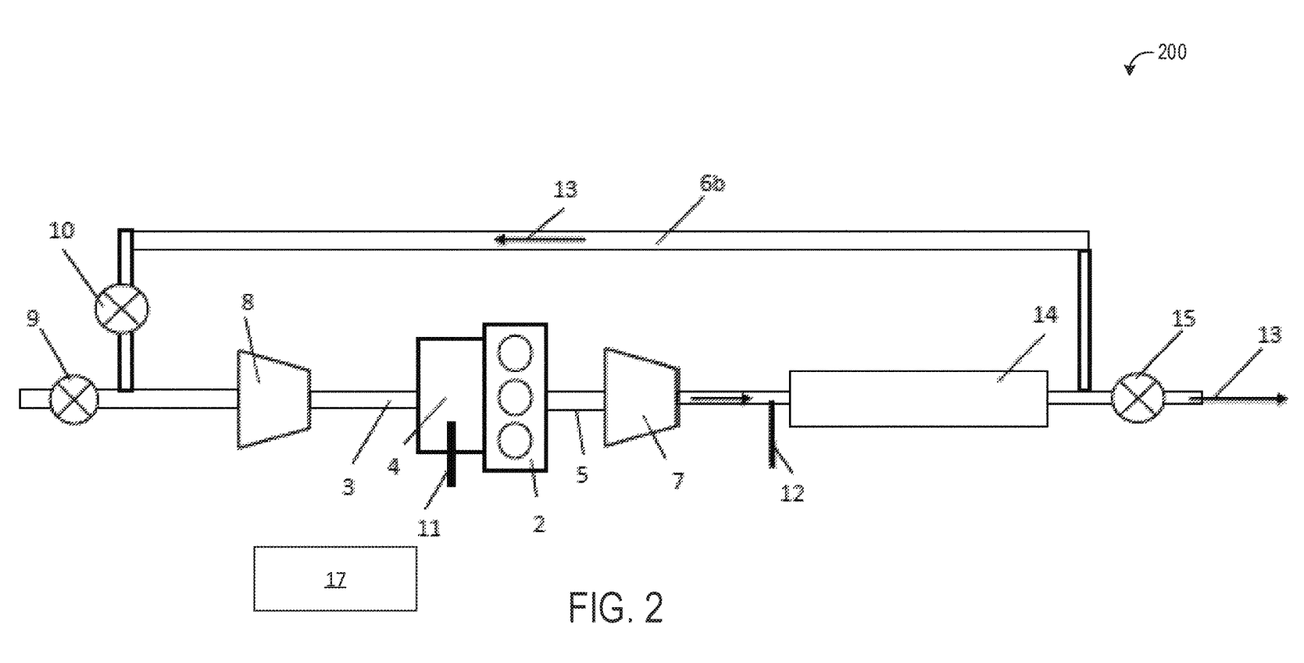
FIG. 2 shows an embodiment of an arrangement according to the disclosure with a low-pressure gas recirculation system.

In the arrangement 200 according to FIG. 2, an embodiment with a low-pressure exhaust gas recirculation system 6b is illustrated. The features of the arrangement 200 according to FIG. 2 correspond to the arrangement 1 according to FIG. 1 with the difference of the exhaust gas recirculation. The low-pressure exhaust gas recirculation system 6b branches off after the turbine 7 and opens into the induction system 3 before the compressor 8. In addition, an exhaust gas throttle valve 15 is disposed in the exhaust system 5 downstream of the branch of the low-pressure exhaust gas recirculation system 6b.

Figure 3:
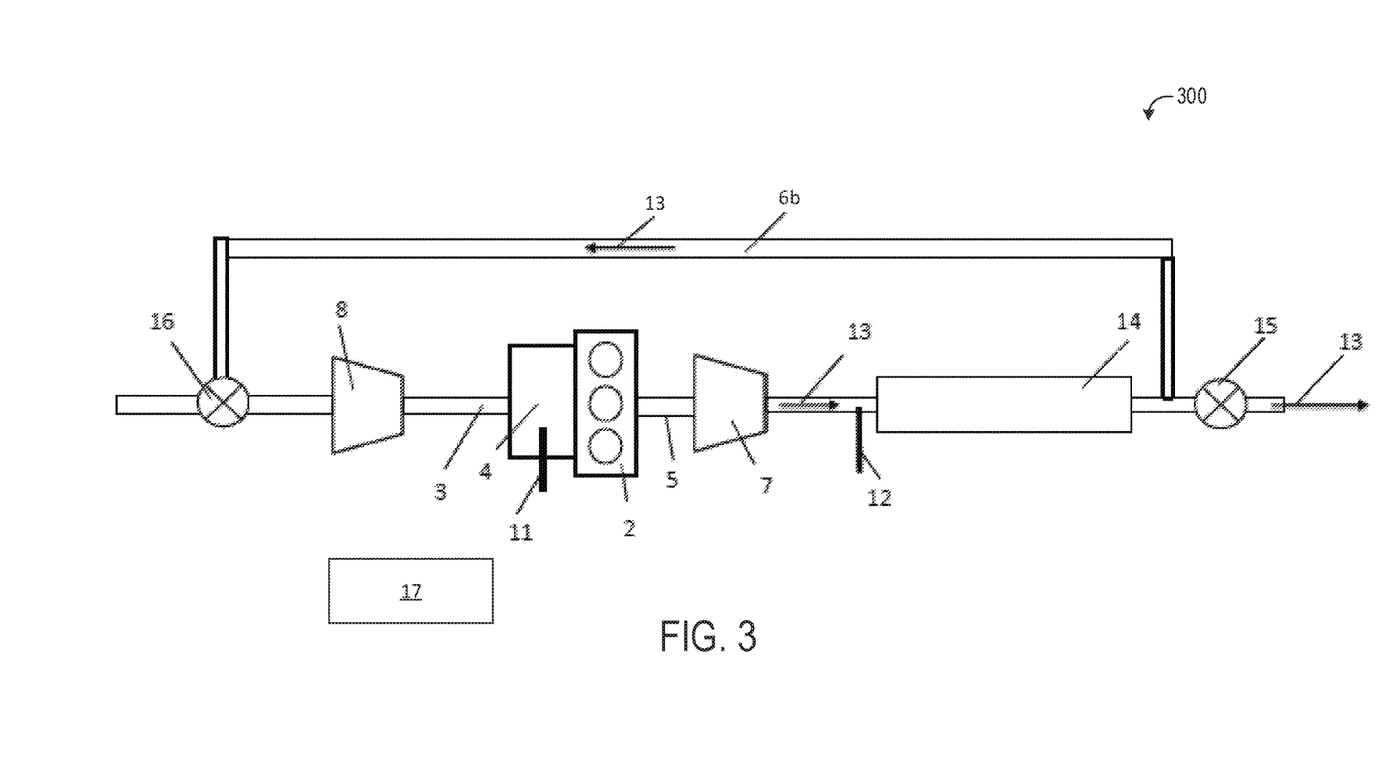
FIG. 3 shows the embodiment according to FIG. 2 with altered induction throttling.

In the arrangement 300 according to FIG. 3, an embodiment with a low-pressure exhaust gas recirculation system 6b is illustrated. The features correspond to those of the arrangement 1 according to FIG. 2, with the difference that the opening of the line of the low pressure exhaust gas recirculation system 6b into the induction system 3 is implemented by a combination valve 16. In the combination valve 16, the features of the induction throttle valve 9 and of the exhaust gas recirculation valve 10 are combined with each other. The combination valve 16 enables the full closure of the induction system 3 with full opening of the exhaust gas recirculation system 6b and vice-versa, or an arbitrary position in which the lines of the induction system 3 and the exhaust gas recirculation system 6b are partly opened.

In one embodiment of the method according to the disclosure at least one $f_{man}$ value and at least one $CNO_x$ value are provided. The value for $f_{man}$ is measured by the $f_{man}$ sensor 11, which is disposed in the plenum chamber 4. The value for $CNO_x$ is measured by the $CNO_x$ sensor 12, which is disposed in the exhaust system before the catalytic converter 14. The measurement takes place under the condition that a target value of a known quantity of fuel injected into the internal combustion engine 2 is predetermined, which is also referred to as the target value of the fuel quantity. A target value of CNOx to be expected is calculated using an actual value of $f_{man}$. An actual value of CNOx is provided, and the provided values are input into a coordinate system, wherein the $f_{man}$ values are plotted on the abscissa and the $CNO_x$ values on the ordinate. In doing so a first curve is determined, the profile of which correlates with a target value of the quantity of fuel injected. The first curve is illustrated in the diagram according to FIG. 5 as a solid line (curve 502).

A deviation of the anticipated target value of $CNO_x$ from the actual value of $CNO_x$ is determined by comparison. If the deviation is positive, then the actual injected quantity of fuel is greater than the target value thereof (dashed line in FIG. 5, curve 504). If the deviation is negative, then the actual injected quantity of fuel is lower than the target value thereof (dotted line in FIG. 5, curve 506). If there is a deviation, the deviation of the actual value is corrected by adjusting to the target value by increasing or reducing the quantity of fuel injected. This takes place by adjusting injectors, by which a smaller or greater quantity than that corresponding to the nominal value is injected such that the quantity corresponding to the target value is reached. If the actual value equals the target value, no change of the quantity of fuel injected is carried out. In this case, the method may be repeated.

The recording of the sensor values, storing the values, creating a coordinate system, detecting deviations of the nominal values from the target values of the quantity of fuel injected and controlling changes of the quantity of fuel injected are carried out by the control device.

Figure 4:
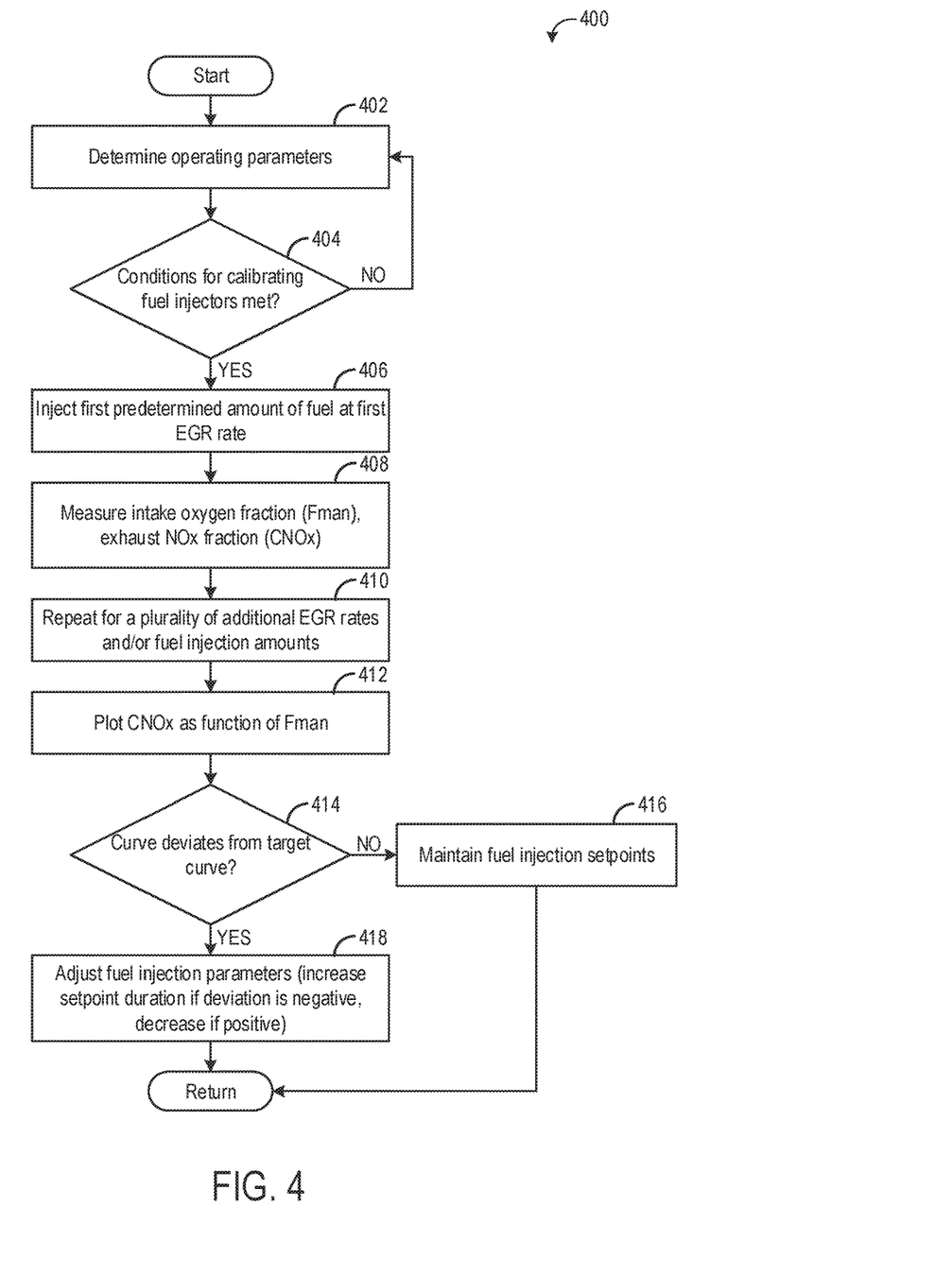
FIG. 4 shows a flow chart of an embodiment of the method according to the disclosure.

Turning now to FIG. 4, a method 400 for calibrating fuel injection parameters is provided. Instructions for carrying out method 400 and the rest of the methods included herein may be executed by a control device (e.g., device 17 of FIGS. 1-3) based on instructions stored on a memory of the device and in conjunction with signals received from sensors of the engine system, such as the sensors described above with reference to FIG. 1. The control device may employ engine actuators of the engine system to adjust engine operation, according to the methods described below.

At 402, method 400 includes determining operating parameters. The determined operating parameters may include engine speed, engine load, fuel injection amount, EGR rate, and other parameters. At 404, method 400 includes determining if the conditions for calibrating the fuel injection parameters are met. The conditions may include steady state operating conditions, wherein engine speed and load are changing by less than a threshold amount. During steady state conditions, fuel injection amounts provided to the engine may remain steady. Other conditions may include EGR being activated, a predetermined amount of time having elapsed since a previous calibration was carried out, and/or other conditions.

If the conditions for carrying out the calibration are not met, method 400 loops back to 402 to continue to assess operating conditions until the conditions are met.

Once the conditions are met, method 400 proceeds to 406 to inject a first predetermined amount of fuel at a first EGR rate. The predetermined amount of fuel may be the amount of fuel commanded for the engine for the current operating conditions, or it may be another suitable amount of fuel. The first EGR rate may be an EGR rate commanded by the engine for the current operating conditions, or another suitable rate.

At 408, method 400 includes measuring the intake oxygen fraction and the exhaust NOx fraction (CNOx), based on signals output from the Fman sensor and NOx sensor, respectively. Based on the intake oxygen fraction, the mass of combusted exhaust in the intake volume inducted to the cylinders may be determined (Fman). The measured values may be stored in memory of the control device along with the predetermined amount of fuel and first EGR rate.

At 410, method 400 includes repeating the measuring of the intake oxygen fraction and exhaust NOx fraction at a plurality of different fuel injection amounts and/or EGR rates. For each measurement, the respective Fman and CNOx is stored in memory with the fuel injection amount and EGR rate.

At 412, each measured CNOx value is plotted as a function of the corresponding measured Fman value to generate a curve. Further, in some examples, an expected CNOx for each measured Fman value and corresponding fuel injection amount may be determined, and each expected CNOx value plotted as a function of the corresponding measured Fman value to generate a target curve. In other examples, the target curve may be predetermined and stored in memory of the control device.

Figure 5:
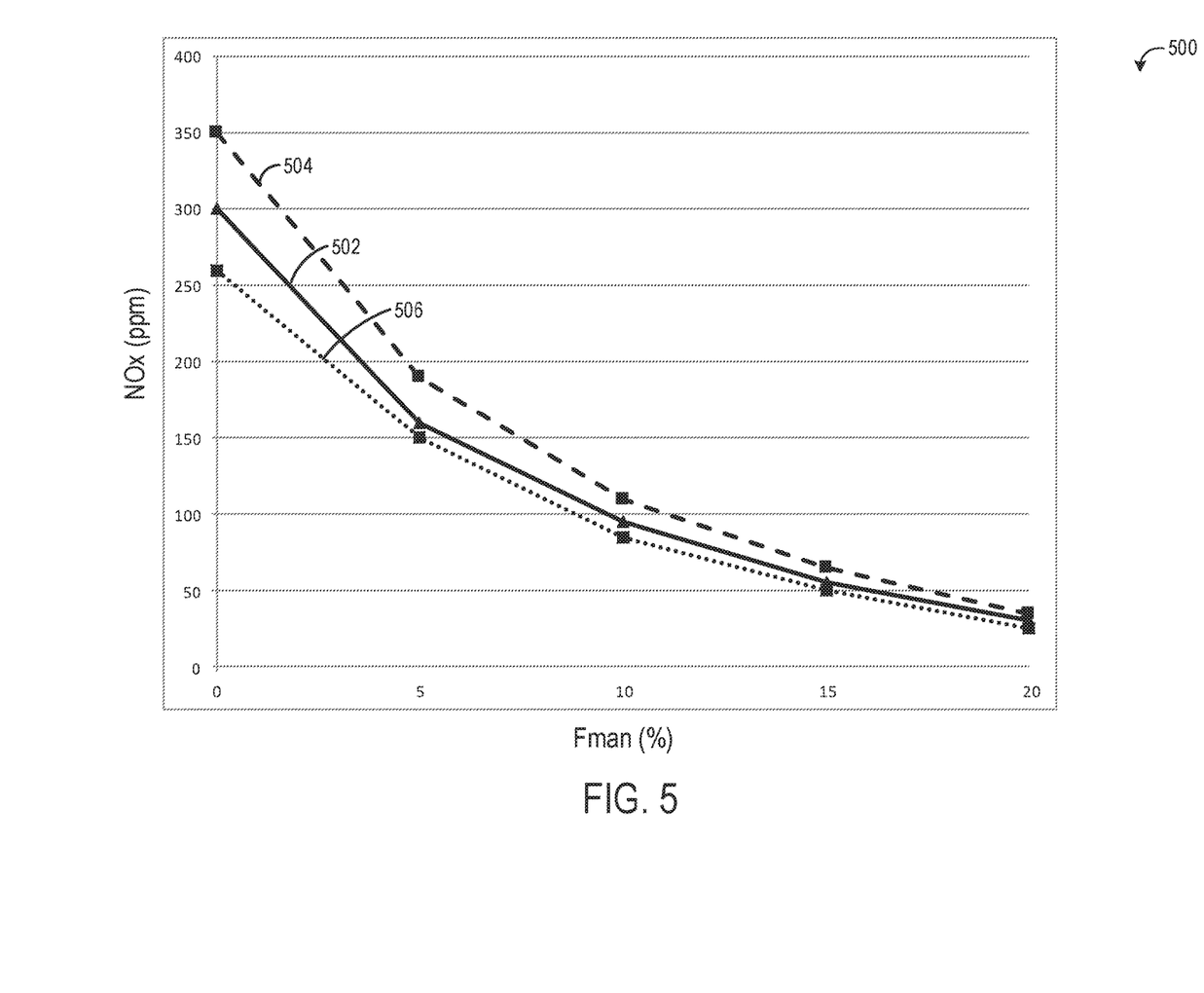
FIG. 5 shows a diagram with a graph of the dependency of the concentration of oxides of nitrogen in the exhaust system on the component of the combusted mass of gas in the induction system.

For example, FIG. 5 is a diagram 500 showing various fuel injection parameter calibration curves. For diagram 500, measured Fman values (shown in percentage of the intake volume or mass flow) are plotted along the x-axis and either expected or measured CNOx values (shown in ppm) are plotted along the y-axis. In one example, a single predetermined fuel injection amount with varying EGR rates are used to generate the curves. In other examples, fuel injection amounts and/or EGR rates may be varied to generate the curves. A first curve 502 may be a target curve where the CNOx values are calculated based on the commanded (expected) fuel injection amount and measured Fman. A second curve 504 and third curve 506 may each be examples of measured curves where the CNOx values are measured and plotted as a function of the corresponding measured Fman.

At 414, method 400 determines if the curve deviates from the target curve. The determination of whether the curve deviates from the target curve may be made in a suitable manner. In one example, a plurality of CNOx values at Fman points along the target curve (e.g., at 5%, 10%, and 15%) may be compared to CNOx values at similar points along the curve, and if the values differ by more than a threshold (e.g., 5%), it may be determined that the curve deviates from the target curve.

If it is determined that the curve does not deviate from the target curve, method 400 proceeds to 416 to maintain current setpoint fuel injection parameters. The current setpoint fuel injection parameters may include a start of injection timing and duration in order to deliver a given commanded quantity of fuel. Method 400 then returns.

If it is determined that the curve does deviate from the target curve, method 400 proceeds to 418 to adjust fuel injection parameters. The adjusted fuel injection parameters may include the start of injection timing and/or duration to deliver a commanded quantity of fuel. In one example, if the deviation is a positive deviation (e.g., where the actual CNOx value is higher than expected), the duration of the fuel injection may be decreased, and if the deviation is a negative deviation (e.g., where the actual CNOx value is lower than expected), the duration of the fuel injection may be increased. In one example, the duration of the fuel injection may be adjusted, and the CNOx measured. The fuel injection duration may then be adjusted until the target CNOx value (for the given Fman) is reached. Method 400 then returns.

Referring again to FIG. 5, the second curve 504 may be a positive deviation curve where the measured CNOx values are higher than the expected CNOx values from the target curve, while the third curve 506 may be a negative deviation curve where the measured CNOx values are lower than the expected CNOx values from the target curve.

Figure 6:
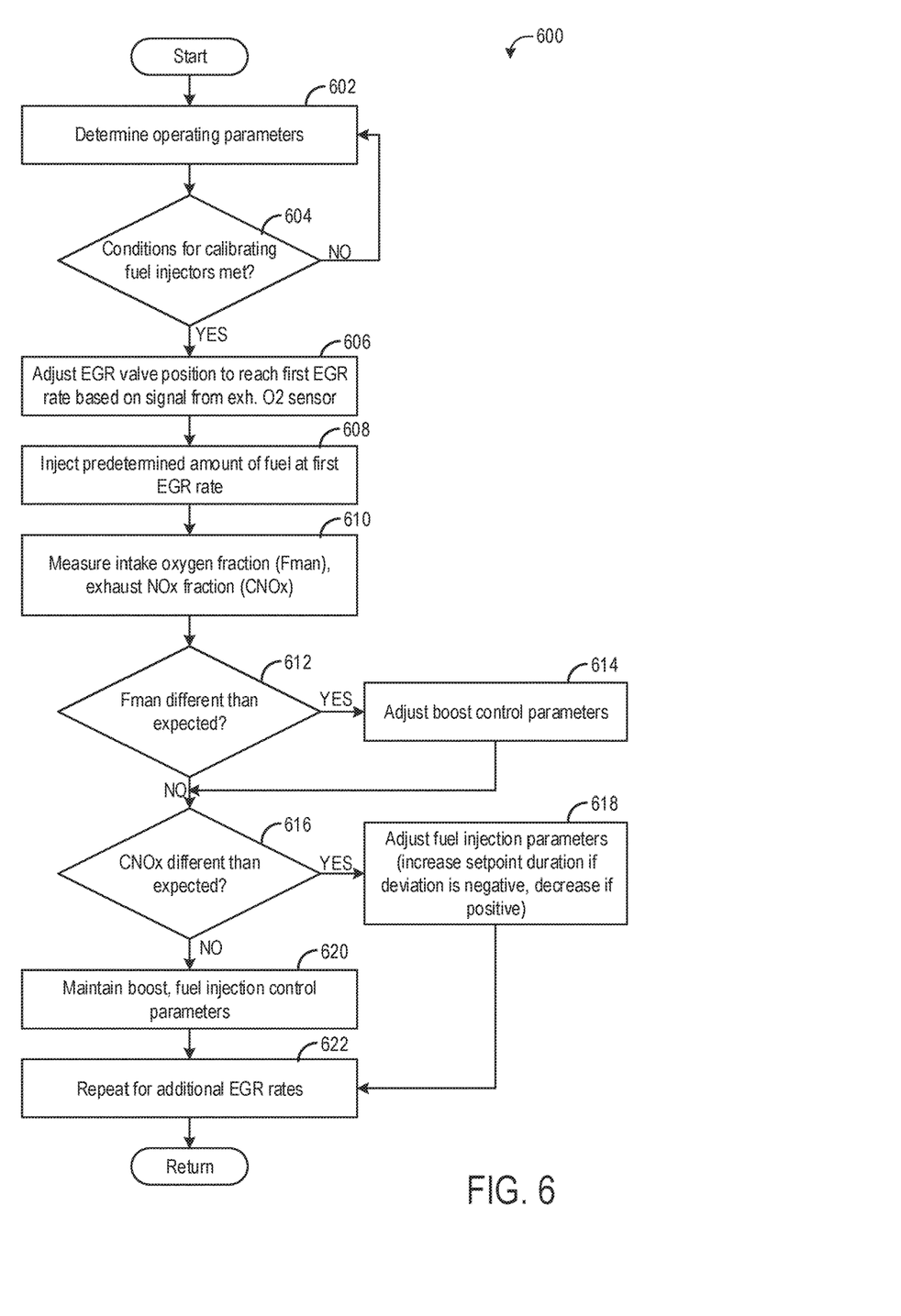
FIG. 6 shows a flow chart of a further embodiment of the method according to the disclosure.

FIG. 6 is a flow chart illustrating a method 600 for calibrating fuel injection parameters when an exhaust oxygen sensor is present, in order to perform the calibration at a known EGR rate and remove EGR rate errors and boost errors from the calibration. Method 600 may be performed independently of method 500 in some examples (e.g., only one of methods 500 or 600 may be performed). In other examples, method 500 and method 600 may be performed together, such that both methods of calibrating fuel injection parameters may be used to ensure commanded quantities of fuel are injected to the engine.

At 602, method 600 includes determining operating parameters. The determined operating parameters may include engine speed, engine load, fuel injection amount, EGR rate, and other parameters. At 604, method 600 includes determining if the conditions for calibrating the fuel injection parameters are met. The conditions may include steady state operating conditions, wherein engine speed and load are changing by less than a threshold amount. During steady state conditions, fuel injection amounts provided to the engine may remain steady. Other conditions may include EGR being activated, a predetermined amount of time having elapsed since a previous calibration was carried out, and/or other conditions.

If the conditions for carrying out the calibration are not met, method 600 loops back to 602 to continue to assess operating conditions until the conditions are met.

Once the conditions are met, method 600 proceeds to 606 to adjust EGR valve position to reach a first EGR rate based on a signal from the exhaust oxygen sensor. The EGR rate may be determined based on the equation rEGR=Fman/Fexh, where Fexh is 1−(O2_lambda/O2_fresh air). In this way, the signal from the exhaust oxygen sensor may be used as feedback to control the EGR rate, ensuring that any deviations away from the commanded first EGR rate are corrected. At 608, method 600 includes injecting a predetermined amount of fuel at the first EGR rate. The predetermined amount of fuel may be the amount of fuel commanded for the engine for the current operating conditions, or it may be another suitable amount of fuel. The first EGR rate may be an EGR rate commanded by the engine for the current operating conditions, or another suitable rate.

At 610, method 600 includes measuring the intake oxygen fraction and the exhaust NOx fraction (CNOx), based on signals output from the Fman sensor and NOx sensor, respectively. Based on the intake oxygen fraction, the mass of combusted exhaust in the intake volume inducted to the cylinders may be determined (Fman). The measured values may be stored in memory of the control device along with the predetermined amount of fuel and first EGR rate.

At 612, method 600 determines if the measured Fman is different than expected Fman. The expected Fman may be the Fman that would be expected to observed for the commanded EGR rate. If the measured Fman is different than the expected Fman, method 600 proceeds to 614 to adjust one or more boost control parameters. In this way, when the EGR rate is controlled based on exhaust oxygen levels, any deviations in the measured Fman may be attributed to boost pressure errors. For example, boost pressure may be lower than commanded for the current operating conditions, resulting in a higher relative Fman (e.g., a higher concentration of exhaust in the intake manifold). The boost control parameters that may be adjusted include a position of a wastegate coupled across the turbine of the turbocharger, a position of a compressor bypass valve coupled across the compressor of the turbocharger, a throttle position, or other suitable parameters.

If the measured Fman is not different than the expected Fman, or once the boost control parameters are adjusted, method 600 proceeds to 616 to determine if the measured CNOx is different than an expected CNOx. The expected CNOx may be determined based on the measured Fman, EGR rate, and/or fuel injection amount, as described above with respect to FIGS. 4 and 5. If the measured CNOx is different than expected, method 600 proceeds to 618 to adjust fuel injection parameters. As explained previously, the fuel injection duration may be increased or decreased until the measured CNOx reaches the expected CNOx.

If the measured CNOx is not different than the expected CNOx, method 600 proceeds to 620 to maintain the current fuel injection control parameters and, if applicable, maintain the boost control parameters. At 622, method 600 optionally includes repeating the method for additional different EGR rates. Method 600 then returns.

In the above-described methods 500 and 600, the fuel injection parameters that are adjusted may also include fuel injection setpoints that are stored in memory of the control device (e.g., in a look-up table). In this way, when the control device sends a signal to the fuel injectors of the engine to deliver a commanded amount of fuel following the calibration, the duration of the fuel injection event (which may determine how much fuel is injected) may be adjusted relative to a prior duration to accurately deliver the commanded fuel amount.

The fuel injection calibration described herein is based on the relationship between Nox and Fman. Assuming only the EGR rate is varying, this relationship shows a shape that can often be modeled as, for example, NOx [ppm]=NOx [Fman=0]*exp(−a*Fman). Another equation that may be used to express the relation Nox(fman) is a polynomial, whereby a quadratic or even linear relation may be sufficient.

If now the real injected quantity drifts away from the setpoint quantity, the NOx-fman relationship will also drift, as illustrated in FIG. 5. The NOx increases because for a given Fman and equal other engine settings the combustion temperature has increased due to the increased fuel injection. The NOx-Fman curve will shift up. By observing the error to the nominal curve (whatever the actual fman measured is), the fuel injection can be corrected until the nominal curve is reached again.

When the fman sensor is used to control the intake burnt mass fraction (EGR) to a setpoint value, the fuel error can be adapted until a NOx setpoint is reached. If the EGR rate is differently controlled, the fuel error can be adapted until a random point from the nominal NOx-fman curve is reached. Optionally, the EGR setpoint can be changed to move the point along the NOx-fman curve to the desired NOx or Fman value.

When additionally a lambda sensor (also referred to an exhaust oxygen sensor) is present in the exhaust, additionally the EGR rate can be observed. The EGR rate is calculated based on: rEGR=fman/fexh. Fexh=1−O2_lambda/O2_fresh_air. The EGR setpoint may be controlled based on the EGR rate calculated based on the combination of the Fman sensor in the intake and the lambda sensor in the exhaust. If now the Fman measured value is not equal to its setpoint, the boost pressure is adjusted. If now the NOx measured is different from the value on the nominal NOx-fman curve, the injected fuel quantity is adapted.

In an example, a method includes adjusting an exhaust gas recirculation (EGR) valve position to reach a commanded intake oxygen fraction; responsive to a measured exhaust NOx concentration differing from an expected exhaust NOx concentration, adjusting one or more fuel injection parameters; and responsive to a measured intake oxygen fraction differing from the commanded intake oxygen fraction, adjusting one or more boost control parameters.

In an example, adjusting the EGR valve to reach the commanded intake oxygen fraction comprises adjusting the EGR valve based on feedback from an oxygen sensor positioned in an exhaust system. The method may further comprise calculating the expected exhaust NOx concentration based on a commanded fuel injection amount and the commanded intake oxygen fraction. The measured exhaust NOx concentration may be measured from a signal output from a NOx sensor positioned in an exhaust system. The commanded intake oxygen fraction may be based on engine speed and load, and the measured intake oxygen fraction may be measured from a signal output from an oxygen sensor positioned in an intake system. As used herein, "based on" may include calculations or determinations accessed from a look-up table or other stored information, such as the commanded intake oxygen fraction being stored in a look-up table indexed to engine speed and load. Other calculations or determinations may be used, such as a base value that is offset with a value associated with the speed and load.

In examples, adjusting one or more fuel injection parameters comprises adjusting a duration of one or more fuel injection events. Adjusting one or more boost control parameters comprises adjusting a position of a wastegate coupled across a turbine of a turbocharger. For each adjustment, corresponding setpoints stored in memory of the control device may also be adjusted so that subsequent engine operation may be performed with the adjusted fuel injection duration and/or wastegate position.

An embodiment of a system includes an intake manifold fluidically coupled to an engine; an exhaust gas recirculation (EGR) system configured to direct exhaust gas from an exhaust system of the engine to the intake manifold; an exhaust oxygen sensor positioned in the exhaust system; an intake oxygen sensor positioned in the intake manifold; a NOx sensor positioned in the exhaust system; and a control device storing instructions in memory executable by the control device to: adjust a flow rate of exhaust gas through the EGR system based on a signal output from the exhaust oxygen sensor; determine an expected concentration of NOx in the exhaust system based on a signal output from the NOx sensor and determine an expected concentration of NOx in the exhaust system based on a signal output from the intake oxygen sensor and based on a fuel injection amount; and adjust one or more fuel injection parameters responsive to the measured concentration of NOx in the exhaust system differing from the expected concentration of NOx in the exhaust system.

The system may further comprise a turbocharger comprising a turbine positioned in the exhaust system and a compressor positioned in the intake system, an amount of boost pressure provided by the turbocharger controlled by a wastegate coupled across the turbine. The control device stores instructions executable to adjust a position of the wastegate responsive to a measured intake oxygen concentration differing from an expected intake oxygen concentration, the measured intake oxygen concentration measured from the signal output by the intake oxygen sensor, and the expected intake oxygen concentration based on the flow rate of exhaust gas through the EGR system.

The control device may store instructions executable to increase a fuel injection duration when the measured NOx concentration is less than the expected NOx concentration. The control device may store instructions executable to decrease a fuel injection duration when the measured NOx concentration is greater than the expected NOx concentration.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for controlling an internal combustion engine of a motor vehicle having an induction system, an exhaust system, and an exhaust gas recirculation system, wherein, via the exhaust gas recirculation system, a part of an exhaust gas mass flow that is produced by the internal combustion engine is branched off from the exhaust system, is recirculated into an induction plenum chamber of the induction system, and is introduced from there into the internal combustion engine, the method comprising:
    providing a target ratio between a component of a combusted mass of gas in the induction system ($f_{man}$) and a concentration of oxides of nitrogen molecules ($CNO_x$);
    calculating a target value of a $CNO_x$ working point based on a $f_{man}$ actual value and a corresponding quantity of fuel injected;
    providing an actual value of $CNO_x$;
    performing a comparison between the provided actual value and the target value of $CNO_x$; and
    correcting an existing deviation of the actual value of $CNO_x$ by adjusting to the corresponding target value by increasing or reducing the quantity of fuel injected.

2. The method as claimed in claim 1, wherein calculating the target value of the $CNO_x$ working point comprises calculating the target value of the $CNO_x$ working point based on a profile of a determined curve that is given by the equation $CNO_x = \exp(-a \cdot f_{man} - b)$, wherein a and b are mathematical coefficients of a function description.

3. The method as claimed in claim 1, wherein the injected quantity of fuel is increased if a deviation of the actual value of $CNO_x$ from the corresponding target value of $CNO_x$ is negative, and is reduced if the deviation of the actual value of $CNO_x$ from the corresponding target value of $CNO_x$ is positive.

4. The method as claimed in claim 3, wherein the deviation is corrected until an arbitrary point of a first curve is reached.

5. The method as claimed in claim 1, wherein the recirculated part of the exhaust gas mass flow is controlled depending on a ratio of the $f_{man}$ value to an oxygen content in the exhaust system.

6. The method as claimed in claim 1, wherein the exhaust gas recirculation system is a low pressure gas recirculation system.

7. The method as claimed in claim 1, wherein the exhaust gas recirculation system is a high pressure gas recirculation system.

8. A method, comprising:
    adjusting an exhaust gas recirculation (EGR) valve position to reach a commanded intake oxygen fraction;
    injecting a commanded fuel amount corresponding to the commanded intake oxygen fraction;
    responsive to a measured exhaust NOx concentration differing from an expected exhaust NOx concentration based on the corresponding commanded intake oxygen fraction and the commanded fuel amount, adjusting one or more fuel injection parameters; and
    responsive to a measured intake oxygen fraction differing from the commanded intake oxygen fraction, adjusting one or more boost control parameters.

9. The method of claim 8, wherein adjusting the EGR valve position to reach the commanded intake oxygen fraction comprises adjusting the EGR valve position based on feedback from an oxygen sensor positioned in an exhaust system.

10. The method of claim 8, further comprising calculating an expected exhaust NOx concentration based on the commanded fuel injection amount and the commanded intake oxygen fraction and wherein the measured exhaust NOx concentration is measured from a signal output from a NOx sensor positioned in an exhaust system.

11. The method of claim 8, wherein the commanded intake oxygen fraction is based on engine speed and load, and wherein the measured intake oxygen fraction is measured from a signal output from an oxygen sensor positioned in an intake system.

12. The method of claim 8, wherein adjusting one or more fuel injection parameters comprises adjusting a duration of one or more fuel injection events.

13. The method of claim 8, wherein adjusting one or more boost control parameters comprises adjusting a position of a wastegate coupled across a turbine of a turbocharger.

14. A system, comprising:
    an intake manifold fluidically coupled to an engine;
    an exhaust gas recirculation (EGR) system configured to direct exhaust gas from an exhaust system of the engine to the intake manifold;
    an exhaust oxygen sensor positioned in the exhaust system;
    an intake oxygen sensor positioned in the intake manifold;
    a NOx sensor positioned in the exhaust system; and
    a control device storing instructions in memory executable by the control device to:

adjust a flow rate of exhaust gas through the EGR system based on a signal output from the exhaust oxygen sensor;

determine a measured concentration of NOx in the exhaust system based on a signal output from the NOx sensor and determine an expected concentration of NOx in the exhaust system based on a signal output from the intake oxygen sensor and a fuel injection amount; and adjust one or more fuel injection parameters responsive to the measured concentration of NOx in the exhaust system differing from the expected concentration of NOx in the exhaust system.

15. The system of claim 14, further comprising a turbocharger comprising a turbine positioned in the exhaust system and a compressor positioned in an intake system, an amount of boost pressure provided by the turbocharger controlled by a wastegate coupled across the turbine.

16. The system of claim 15, wherein the control device stores instructions executable to adjust a position of the wastegate responsive to a measured intake oxygen concentration differing from an expected intake oxygen concentration, the measured intake oxygen concentration measured from the signal output from the intake oxygen sensor, and the expected intake oxygen concentration based on the flow rate of exhaust gas through the EGR system.

17. The system of claim 14, wherein the control device stores instructions executable to increase a fuel injection duration when the measured NOx concentration is less than the expected NOx concentration.

18. The system of claim 14, wherein the control device stores instructions executable to decrease a fuel injection duration when the measured NOx concentration is greater than the expected NOx concentration.

* * * * *